May 2, 1933.   S. M. HALSTEAD ET AL   1,906,959
VALVE
Filed June 19, 1928   2 Sheets-Sheet 1
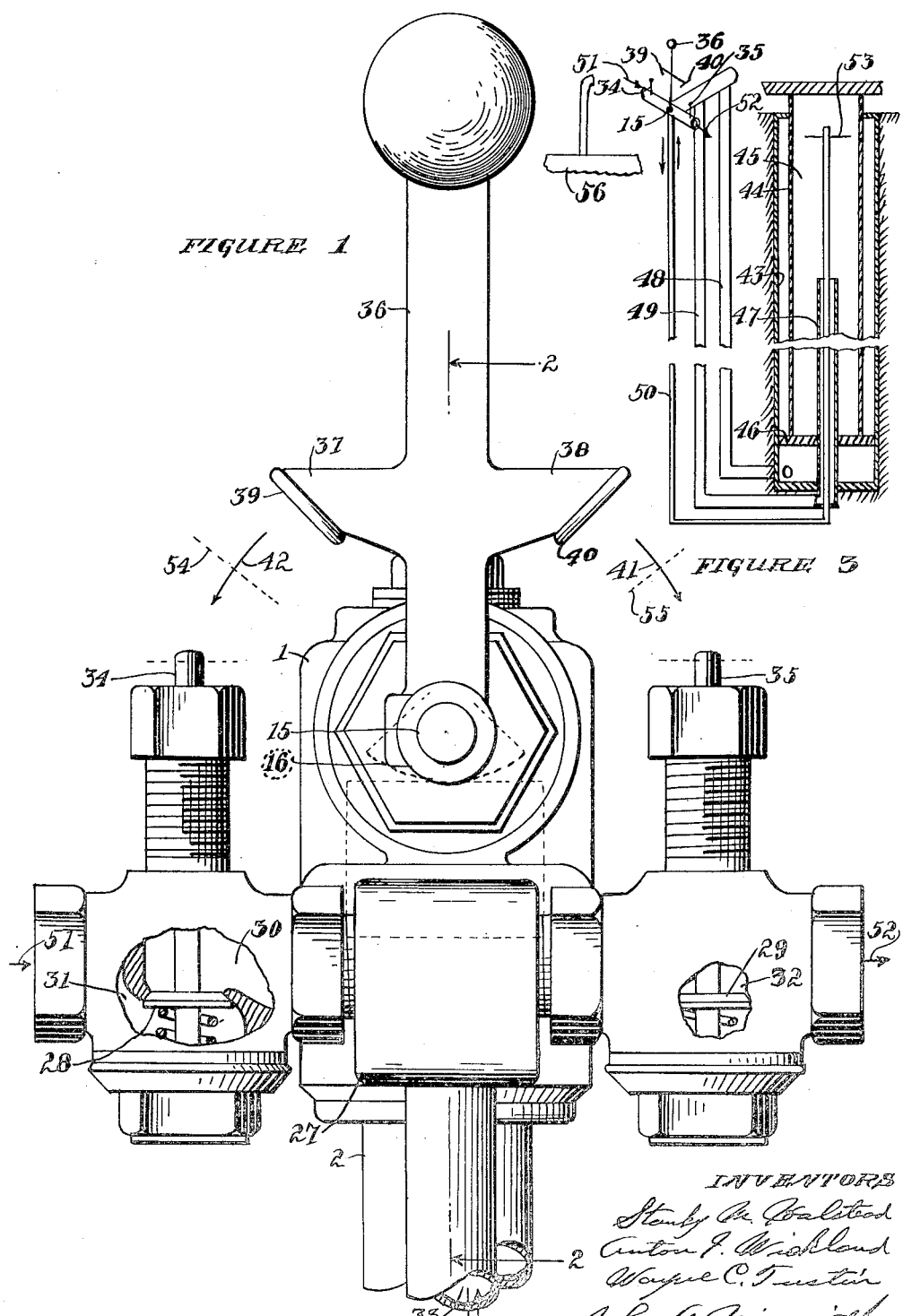

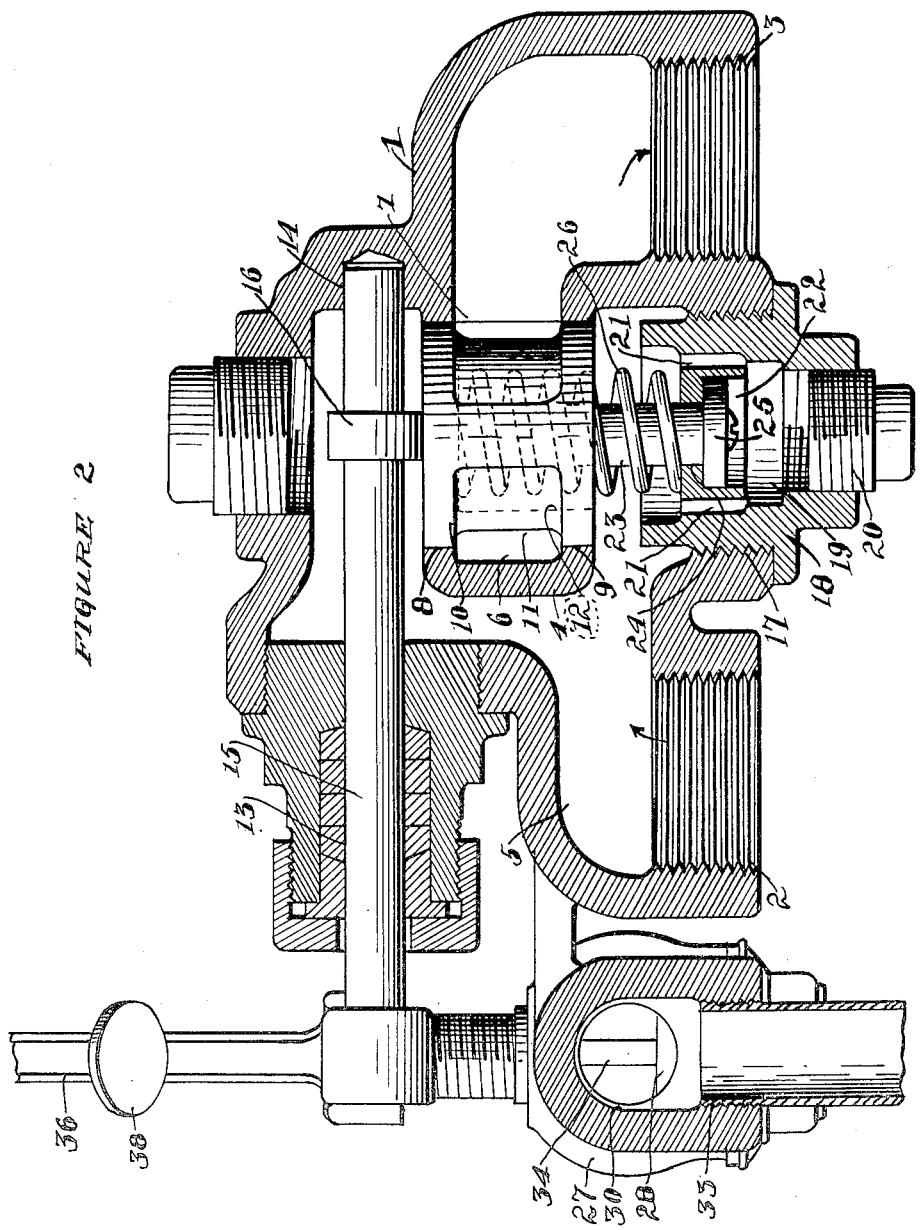

Patented May 2, 1933

1,906,959

UNITED STATES PATENT OFFICE

STANLEY M. HALSTEAD, ANTON I. WICKLAND, AND WAYNE C. TUSTIN, OF SAN JOSE, CALIFORNIA, ASSIGNORS, BY DIRECT AND MESNE ASSIGNMENTS, TO WAYNE COMPANY, OF FORT WAYNE, INDIANA, A CORPORATION OF INDIANA

VALVE

Application filed June 19, 1928. Serial No. 286,526.

This invention relates particularly to a type of valve adapted for use in connection with the operation of elevators such as disclosed in our copending application bearing Serial No. 264,345 and filed March 24, 1928, and wherein a noncompressible liquid and a compressible fluid are used in desired varying proportions to effect operation of the piston.

It is one object of our invention to provide a valve structure wherein the flow of the liquid and the compressible fluid may be controlled through the operation of a single handle.

It is another object of the invention to provide a valve means so constructed and arranged that the flow of the liquid and the compressible fluid may be controlled in such a manner as to conserve the energy utilized in compressing the fluid as hereinafter more particularly set forth.

It is also an object of the invention to provide a valve structure of the character indicated that will be simple in form and construction, economical to manufacture, positive in operation and highly efficient in its practical application.

In the drawings:

Figure 1 is an elevation of the device embodying our invention, parts being broken away.

Figure 2 is a sectional view on line 2—2 of Figure 1.

Figure 3 is a diagrammatical illustration showing the mode of application of a valve embodying our invention.

Referring now more particularly to the drawings, we show at 1 a housing having an inlet at 2 and an outlet at 3, these openings in the present case being arranged on vertical and parallel axes spaced a distance apart as shown.

At 4 is shown a portion of the housing extending inwardly to the center of the chamber 5 which encloses it, and provided with an annular chamber 6 communicating with the discharge passage 3 at 7, and communicating with the inlet 2 above and below as indicated at 8 and 9 respectively.

A valve is shown at 10 slidably engaging both openings 8 and 9 and normally closing the same, but provided with recessed sides as at 11 whereby liquid will be permitted to flow thereby when the valve is depressed a distance as hereinafter set forth. This valve is preferably hollow as indicated in dotted lines at 12.

Positioned immediately over the upper end of valve 10 and mounted in bearings 13—14 is a shaft 15, and this shaft is provided with a cam member 16 contacting with the upper surface of the valve whereby rotation of the shaft in either direction will operate to depress the valve.

We show a tapped opening at 17 formed in the housing 1 in axial alignment with the valve 10 and fitted with a member 18. The member 18 has a chamber 19 formed therein with a closure therefor at 20, the said chamber communicating with the chamber 5 in housing 1 by means of conduits 21. In the top of chamber 19 is formed a recess 22.

The valve 10 is provided with a depending stem 23 which passes through an opening 24 in member 18 where it terminates in a head 25 seated in recess 22. A spring 26 is mounted on the stem 23 and bears against the valve 10 and the member 18 as shown.

An auxiliary housing is shown at 27, preferably formed integrally with housing 1 and lying in a plane at right angles to the axis of shaft 15. Mounted in this housing are a pair of spaced and normally closed valves as 28 and 29 respectively, communicating with a connecting passage 30 and with passages 31 and 32 respectively. The connecting passage 30 is provided with an opening 33.

The valve stems 34 and 35 extend upwardly a given distance as shown, one on each side of the shaft 15, and the shaft 15 is fitted with a handle 36 swinging in the plane of the valve stems. On each side of the handle 36 is formed a finger as at 37 and 38, the said fingers being provided with terminal plates 39 and 40 so positioned as to contact with the valve stems 34 and 35 when the handle 36 is swung through a suitable arc in one direction or the other.

It is obvious from the foregoing description that when the valve is assembled a movement of the handle 36 through the arc indicated by the arrow 41 will first operate the cam 16 to open valve 10 a distance and then open the valve 29. In returning the handle to its normal position the valve 29 first closes and then the valve 10. Likewise when the handle is swung through the arc indicated by the arrow 42, first the valve 10 is opened and then the valve 28, and when the handle is returned to its normal position the valve 28 first closes and is followed by the valve 10.

At 43 we show a fixed cylinder having a piston 44 mounted to reciprocate therein, the cylinder being hollow to form a chamber 45 and having a head 46 fitting closely in fixed cylinder 43 and around a standpipe 47 extending upwardly through the head 46 and through the bottom of the cylinder 43. The cylinder 43 is connected to the opening 3 in the valve housing 1 by means of a pipe 48, and the standpipe 47 is connected to the opening 2 in the housing by means of a pipe 49. At 50 is shown a pipe extending through the standpipe 47 to the upper portion of the chamber 45 at one end, the other end being connected to the opening 33 in housing 27. One passage as 31 in housing 27 is connected to an air compresser not shown, the compressed air flowing in the direction indicated by the arrow 51, and the other passage, 32, exhausts into the atmosphere, the air flowing in the direction indicated by the arrow 52.

When ready for use the piston 44 is filled with a noncompressible liquid such as oil to a suitable point as 53, the liquid also filling the pipes 48 and 49 and the chambers 5 and 19 of the valve. A load being placed upon the piston the handle 36 of the valve is now swung through the arc 42 first opening the valve 10. No action takes place at this time because the piston is already at its lowermost point, but as soon as the plate 39 contacts with valve stem 34 and opens the valve 28 then the compressed air is admitted to pipe 50 and chamber 45 and the oil is forced out of the chamber through pipe 49, valve chamber 5 and pipe 48 into the cylinder 48 below the piston head 46, this transfer of the liquid causing the piston to rise.

While the valve 28 is open the air pressure in the chamber 45 builds up much faster than necessary for the load to be raised, but with this valve the full lifting power of the air is utilized because by returning the handle 36 to the point 54 the air supply is cut off but the flow of oil through valve 10 is not interrupted, consequently the air already in chamber 45 may continue to expand until it equalizes with the load. If so desired the movement of the piston may be instantly arrested by returning the handle to its normal vertical position and allowing the spring 7 to return the valve 10 to a closed position thereby stopping the transfer of liquid. The lowering of the piston may be accurately controlled in the same manner, the air exhausting from the chamber 45 when valve 29 is open, and plate 40 in position 55 showing that valve 29 is closed and valve 10 open thereby allowing the piston to "coast" until the air pressure equalizes.

The valve structure 10 and 18 to 26 is such that movement of the valve 10 is effected without jar, and consequently without developing water-hammer. When the valve is opened the part 25 is moved out of the recess 22 and into the chamber 19, thereby permitting the liquid to flow into and fill the recess 22. When the valve is closed by the action of the spring 26 the liquid in the recess 22 is trapped by the return movement of part 25 and this trapped liquid prevents the sudden closing of the valve. The trapped liquid is gradually forced out of the recess through the clearance between the part 25 and the side wall of recess 22, and between the stem 23 and side of opening 24, thereby constituting a dash-pot that effectually prevents sudden closing of the valve.

Any suitable means may be provided for supplying a compressed fluid to the conduit 50 through valve 28, in the present case compressed air being supplied from a suitable source of supply as indicated in part at 56.

Another important feature of this invention is, that whenever the handle 36 is moved out of its vertical position and released it is automatically returned to its normal position. This is accomplished by means of the action of the spring 26 in forcing the valve 10 against the cam 16. Obviously, if the cam is turned to force the valve 10 open by releasing the handle 36 the spring is permitted to actuate the cam and handle to their original positions. This arrangement assures the immediate stopping of the piston when moving in either direction if the operator for any reason releases the handle 36 before he returns it to its normal position.

It is to be understood, of course, that while we have herein shown and described but one specific embodiment of our invention, changes in form, construction, and method of assembly and operation may be made within the scope of the appended claims.

We claim:

1. A valve comprising a pair of conduits, a normally closed valve mounted in one conduit, a pair of normally closed and spaced valves mounted in the other conduit, the second conduit having a passage communicating therewith intermediate said spaced valves, and a rocker arm operatively mounted relative to all of said valve means and provided with means to actuate first the first mentioned valve means and then one of the second mentioned valve means when rocked.

2. A valve comprising a pair of conduits, a normally closed resiliently mounted valve positioned in one conduit, a pair of normally closed, resiliently mounted and spaced valves mounted in the other conduit, the second conduit having a passage communicating therewith intermediate the spaced valves, a rocker arm mounted adjacent the said valves, a cam mounted on the rocker arm to actuate the first valve, and elements mounted on the arm and radially offset relative to the cam and adapted to actuate the second mentioned valves when the arm is rocked.

3. A valve comprising a housing having a plurality of passages, a normally closed valve associated with one of said passages, a pair of normally closed valves associated with another of said passages, and means for actuating said first mentioned valve independently of said second mentioned valves, said means including a rocker arm for operating either one of said second mentioned valves in conjunction with the actuation of said first mentioned valve.

4. A valve comprising a housing having a plurality of passages, a normally closed valve associated with one of said passages, a pair of normally closed valves associated with another of said passages, and means including a rocker arm for actuating either one of said second mentioned valves subsequent to the actuation of said first mentioned valve.

5. A valve comprising a housing having a plurality of passages, a normally closed valve associated with one of said passages, a pair of normally closed valves associated with another of said passages, a cam member associated with said first mentioned valve, and a rocker arm operatively associated with said member, said cam member being associated with said rocker arm so as to actuate said first mentioned valve independently or in conjunction with either of said second mentioned valves.

6. A valve comprising a housing having a plurality of passages, a normally closed valve associated with one of said passages, a pair of normally closed valves associated with another of said passages, a cam member associated with said first mentioned valve, and a rocker arm for actuating said second mentioned valves and operatively associated with said member whereby either one of said second mentioned valves may be actuated subsequent to the actuation of said first mentioned valve.

7. A valve comprising a housing having a plurality of passages, a normally closed valve member associated with one of said passages, a pair of normally closed valve members associated with another of said passages, and means for actuating said first mentioned valve member, said means including a rocker arm for operating either of said second mentioned valve members subsequent to the actuation of said first mentioned valve member.

8. A valve comprising a housing having a plurality of passages, a normally closed valve member associated with one of said passages, a pair of normally closed valve members associated with another of said passages, and means for actuating said first mentioned valve member independently of or in conjunction with one of said second mentioned valve members, said means including a rocker arm for actuating either one of said second mentioned valve members subsequent to the actuating of said first mentioned valve member when said members are actuated in conjunction.

9. A valve comprising a housing having a plurality of passages, a normally closed valve member associated with one of said passages, a pair of normally closed valve members associated with another of said passages, a cam member associated with said first mentioned valve member, and a rocker arm operatively associated with said second mentioned valve members, said rocker arm being associated with said cam member whereby said first mentioned valve member may be actuated independently or prior to the actuation of either one of said last mentioned valve members.

STANLEY M. HALSTEAD.
ANTON I. WICKLAND.
WAYNE C. TUSTIN.